(12) United States Patent
Holderle (10) Patent No.: US 8,628,129 B2
(45) Date of Patent: Jan. 14, 2014

(54) CONNECTION MODULE

(75) Inventor: Volker Holderle, Backnang (DE)

(73) Assignee: Decoma (Germany) GmbH, Sulzbach/Saar (DE)

( * ) Notice: Subject to any disclaimer, the term of this patent is extended or adjusted under 35 U.S.C. 154(b) by 129 days.

(21) Appl. No.: 13/387,257

(22) PCT Filed: Aug. 13, 2010

(86) PCT No.: PCT/DE2010/000963
§ 371 (c)(1),
(2), (4) Date: Jan. 26, 2012

(87) PCT Pub. No.: WO2011/018081
PCT Pub. Date: Feb. 17, 2011

(65) Prior Publication Data
US 2012/0146349 A1    Jun. 14, 2012

(30) Foreign Application Priority Data

Aug. 13, 2009 (DE) .......................... 10 2009 038 134

(51) Int. Cl.
*B60R 19/44* (2006.01)

(52) U.S. Cl.
USPC ........................................... 293/102; 296/29

(58) Field of Classification Search
USPC ............ 296/29, 191, 198; 293/102, 121, 154, 293/155
See application file for complete search history.

(56) References Cited

U.S. PATENT DOCUMENTS

| 5,695,296 | A | | 12/1997 | Miura | |
|---|---|---|---|---|---|
| 5,882,054 | A | * | 3/1999 | Devilliers et al. | 293/155 |
| 6,010,169 | A | * | 1/2000 | Cox et al. | 293/120 |
| 6,135,517 | A | * | 10/2000 | Cordebar | 293/155 |
| 6,598,924 | B2 | * | 7/2003 | Palmer et al. | 296/29 |
| 6,641,191 | B1 | * | 11/2003 | Berger et al. | 296/29 |
| 6,715,764 | B2 | * | 4/2004 | Delavalle et al. | 276/29 |
| 6,769,727 | B2 | * | 8/2004 | Delavalle et al. | 296/29 |
| 6,997,491 | B2 | * | 2/2006 | Takahashi | 293/154 |
| 7,083,207 | B2 | * | 8/2006 | Matsuzawa | 293/155 |
| 7,086,679 | B2 | * | 8/2006 | Andre et al. | 296/29 |
| 7,488,032 | B2 | * | 2/2009 | Thakar et al. | 296/198 |
| 7,793,998 | B2 | * | 9/2010 | Matsui et al. | 293/154 |
| 8,029,049 | B2 | * | 10/2011 | Ito et al. | 296/198 |
| 8,167,343 | B2 | * | 5/2012 | Ruder | 293/120 |
| 8,172,285 | B2 | * | 5/2012 | Ruder | 293/120 |

(Continued)

FOREIGN PATENT DOCUMENTS

| DE | 10 2005 029 544 A1 | 1/2007 |
|---|---|---|
| DE | 10 2005 029544 A1 | 1/2007 |

(Continued)

OTHER PUBLICATIONS

PCT International Preliminary Report on Patentability (Feb. 14, 2012).

*Primary Examiner* — Glenn Dayoan
*Assistant Examiner* — Gregory Blankenship
(74) *Attorney, Agent, or Firm* — Jordan IP Law LLC; Todd A. Vaughn (57) ABSTRACT

Provided is a connection module, which is designed as an extension of a fastening rail and is configured for connection to a vehicle bumper covering. The connection module includes a fastening arm which is configured for locking engagement to a flange of the bumper covering.

17 Claims, 6 Drawing Sheets

(56) References Cited

U.S. PATENT DOCUMENTS

| | | | | |
|---|---|---|---|---|
| 8,226,133 B2 * | 7/2012 | Sano | ............................. | 293/155 |
| 8,434,816 B2 * | 5/2013 | Tanaka et al. | ................. | 296/198 |
| 2002/0158484 A1 * | 10/2002 | Delavalle et al. | ............... | 296/29 |
| 2005/0062308 A1 * | 3/2005 | Pfister et al. | ..................... | 296/29 |
| 2006/0012203 A1 * | 1/2006 | Andre et al. | ..................... | 296/29 |
| 2007/0284897 A1 * | 12/2007 | Schwab | ........................ | 293/155 |
| 2012/0146349 A1 * | 6/2012 | Holderle | ....................... | 293/155 |
| 2012/0292938 A1 * | 11/2012 | Hesse et al. | ...................... | 296/29 |
| 2013/0134732 A1 * | 5/2013 | Meyers et al. | .................. | 296/29 |

FOREIGN PATENT DOCUMENTS

| | | |
|---|---|---|
| DE | 10 2006 041 268 A1 | 3/2008 |
| DE | 10 2006 041268 A1 | 3/2008 |
| JP | 60 004443 A | 1/1985 |

* cited by examiner

CONNECTION MODULE

CROSS-REFERENCE TO RELATED APPLICATIONS

The present application is a National Stage Application of PCT International Application No. PCT/DE2010/000963 (filed on Aug. 13, 2010), under 35 U.S.C. §371, which claims priority to German Patent Application No. 10 2009 038 134.1 (filed on Aug. 13, 2009), which are each hereby incorporated by reference in their respective entireties.

FIELD OF THE INVENTION

The present invention relates to a connection module, an arrangement for a vehicle including such a connection module, and a method for installing such an arrangement.

BACKGROUND OF THE INVENTION

A so-called bumper covering for a motor vehicle is usually fastened to a carcass or body of the motor vehicle by a pre-installed fastening rail. However, no additional fastening of a lower edge of the bumper covering to a wheel arch of the motor vehicle is provided.

The preinstalled fastening rail is designed inter alia to secure a joint and/or a gap of the bumper covering to a wing or a side wall of the motor vehicle. As already mentioned, however, the bumper covering is neither held nor stiffened below the fastening rail.

Account should also be taken of the fact that current tool technology limits design possibilities for additional fastening arrangements and fastening geometries in a side region of the bumper covering. In order to be able to connect the bumper covering to the wheel arch cap, usually a flange which follows the wheel arch contour and which is generally referred to as a double flange is integrated in the bumper covering. The flange is typically ejected from the mould by two sliders moving inwards from the bumper covering at an angle of 30° to one another, so that the attachment area of the flange to the bumper covering is thinned in order to avoid surface defects on the outer skin.

Furthermore, in a modern design of a motor vehicle, beads or painting grooves for providing additional fastening possibilities on an inner side of the bumper covering are avoided.

SUMMARY OF THE INVENTION

The present invention relates to a connection module which is designed as an extension of a fastening rail and is to be connected to a bumper covering. The connection module has a fastening arm which is to be latched to a section of the bumper covering designed as a flange of the bumper covering. When the fastening module is used, usually on a motor vehicle, this connection module is latched to the flange of the bumper covering.

Usually, the connection module has along the fastening arm at least one latching hook which is designed to latch behind an aperture in the flange of the bumper covering and/or to latch into this aperture. The fastening arm of the connection module may have at least one channel having a C shaped or U-shaped profile. The at least one latching hook of the fastening arm is typically arranged on a profiled element in a break in the at least one channel having a C-shaped profile.

As an alternative or in addition, the connection module may have along the fastening arm at least one aperture which is to be latched behind by a latching hook integrated in the flange of the bumper covering or by a latching hook on the flange of the bumper covering, and/or into which a latching hook of the bumper covering is to be latched. The fastening arm may have in a region of the at least one aperture a spring tab with which the latching hook of the flange is to be additionally secured.

A mutual latching of the fastening arm to the flange of the bumper covering thus usually takes place by way of latching hooks which latch into openings designed as apertures. Usually, the latching hooks are arranged on a first of the two components, i.e., either the fastening arm or the flange of the bumper covering, and the at least one aperture is arranged on the respective other of the two components. However, it is by all means possible that both components have latching hooks and apertures which are latched to one another during installation.

In one embodiment, the connection module may have along the fastening arm, or along at least one channel having a C shaped profile, at least one bracket module which is designed to engage at least partially around the flange of the bumper covering. By virtue of the bracket module, an additional fastening and/or connection between the fastening arm of the connection module and the flange of the bumper covering can be provided. The at least one bracket module may be formed for example by the at least one channel of the fastening arm.

In one embodiment, the fastening arm has at least in some sections two adjacent channels, both of which have a C shaped profile. The channels are open in opposite directions and serve for stiffening the fastening arm. The flange of the bumper covering is pushed into one of the two channels during installation.

In one embodiment, one end of the fastening arm is to be connected and/or fastened to the fastening rail. The connection module may also be designed as a component of the fastening rail. In this case, one end of the fastening arm is connected to the fastening rail. The fastening rail and the connection module thus form a one-piece structural unit.

In a further variant, the connection module may have a strut which is connected or is to be connected to the fastening arm and/or to the fastening rail. This strut may stabilize the connection module and/or the fastening rail. However, this strut is not absolutely necessary for implementing the invention.

As materials for the fastening rail and the connection module, use may be made, for example, of synthetic polymers from the polyester family in conjunction with thermoplastics (PC/ABS, polycarbonate/acrylonitrile butadiene styrene, or PC/PBT, polycarbonate/polybutylene terephthalate). As materials for the bumper covering, use may be made of olefin-based thermoplastic elastomers, primarily PP/EPDM (polypropylene/ethylene propylene diene rubber).

A geometry of the components of the arrangement can be adapted in an application-specific manner to a geometry of the carcass of the vehicle. It is accordingly possible inter alia to select in a suitable manner a length of the fastening arm.

The arrangement in accordance with the invention for a vehicle includes a connection module as described above.

As a further component of the arrangement, a bumper covering having a flange may usually be provided, the flange of the bumper covering being connected to a wheel arch cap of the vehicle. The arrangement may also include a fastening rail which is to be connected to a carcass of the vehicle.

The invention also relates to a method for installing the above-described arrangement. In this method, the connection module which is designed as an extension of the fastening rail of the arrangement is connected to a bumper covering. In this case, the connection module has a fastening arm which is latched to a flange of the bumper covering.

In one embodiment of this method, the flange of the bumper covering is introduced or pushed into a channel of the fastening arm of the connection module, wherein this channel has a C-shaped profile.

One step of the method may include the measure that at least one latching hook of the fastening arm is latched into at least one aperture in the flange of the bumper covering and thus locked. As an alternative or in addition, at least one latching hook of the flange of the bumper covering is latched into at least one aperture in the fastening arm, and thus, locked.

When assembling or manufacturing a body of a vehicle, said components of the arrangement for the vehicle, i.e., the connection module, the bumper covering and the fastening rail, are connected to one another and/or fastened to one another. In an installed arrangement, therefore, it is provided that the fastening arm is latched to the flange of the bumper covering.

Due to the cost pressure when producing motor vehicles, on bumper coverings or bumper structures nowadays stiffening and/or strengthening parts in the middle or side region of bumper coverings are generally omitted. However, if such stiffening and/or strengthening parts are to be provided, these are limited to a minimum. However, these cost-cutting measures mean, inter alia, that bumper coverings are more flexible, and thus, more movable and consequently tend to flap or vibrate at higher vehicle speeds.

With the connection module provided in the context of the present invention, there is provided inter alia a stiffening and/or strengthening part for a bumper covering. With the connection module, an additional fastening of a wheel arch region of the bumper covering takes place by way of an additional latching of the flange of the bumper covering to the fastening arm of the connection module. In one variant, the connection module is embodied as an at least slightly extended component of the fastening rail, wherein this fastening rail is moreover preinstalled on the carcass of the vehicle.

By flexible adaptation of the fastening arm of the connection module, an assembly and/or joining concept of a vehicle producer wishing to supply vehicles with the connection module can be taken into account. Furthermore, predefined concepts with regard to a centering and/or tolerance of the components to be assembled and/or a joining concept between said components can be retained. There is also achieved as a result a substantial saving in terms of costs, components and weight when manufacturing a bumper.

On a whole, with the invention it is possible, inter alia, to provide a rigid fastening between the carcass/body and the fastening rail, and thus, between the carcass/body and the bumper covering.

Further advantages and embodiments of the invention will become apparent from the description and the appended drawings.

It will be understood that the features mentioned above and those yet to be explained below can be used not only in the combination specified in each case but also in other combinations or alone, without departing from the scope of the present invention.

BRIEF DESCRIPTION OF THE DRAWINGS

The invention is shown schematically on the basis of examples of embodiments in the drawings and will be described in detail below with reference to the drawings.

DETAILED DESCRIPTION OF EMBODIMENTS

The figures will be described in a related and overlapping manner; identical references denote identical components.

Figure 1:
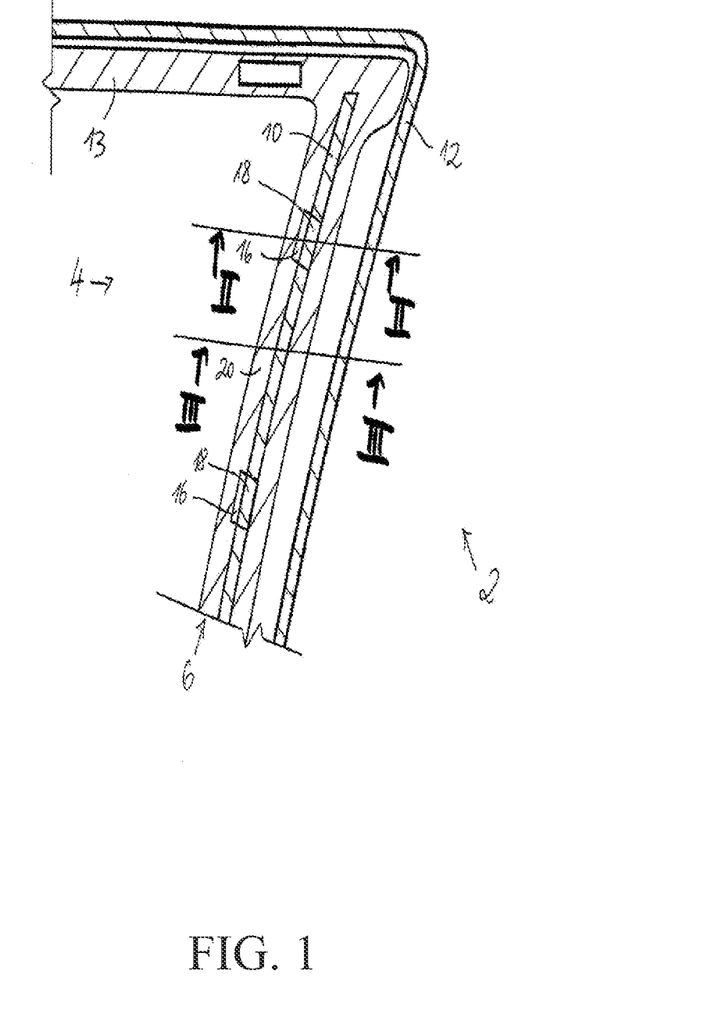
FIG. 1 illustrates a schematic view of a first embodiment of an arrangement in accordance with the invention.

FIG. 1 illustrates in a schematic view, a first embodiment of an arrangement 2 in accordance with the invention for a vehicle. This arrangement 2 includes a first embodiment of a connection module 4 having a fastening arm 6. The arrangement 2 further includes a first embodiment of a flange 10 of a bumper covering 12 and a first embodiment of a fastening rail 13.

A first section line II-II and a second section line through the arrangement 2 are indicated in FIG. 1. Details regarding these can be found in FIGS. 2 and 3, respectively.

Figure 2:
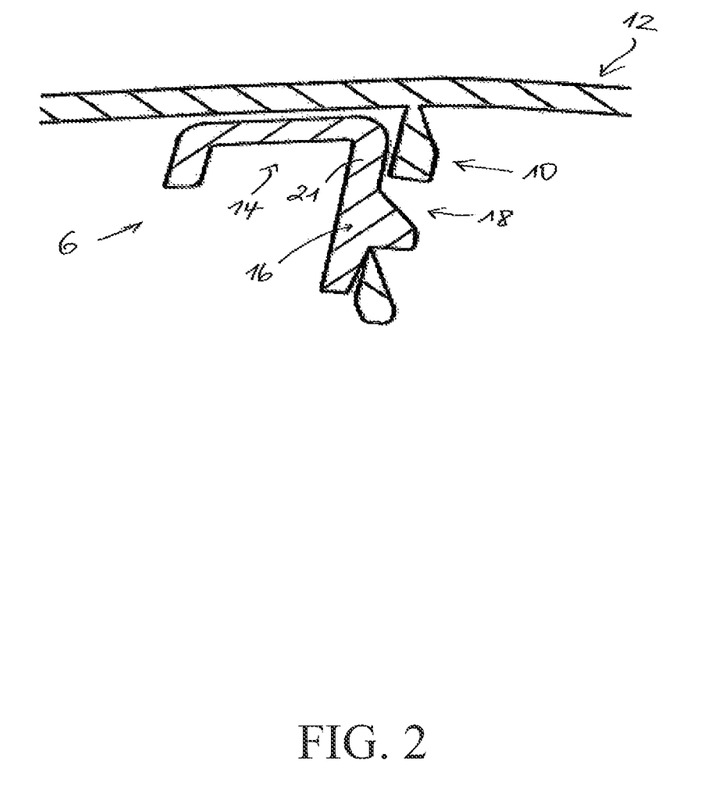
FIG. 2 illustrates a cross-section along the section line II-II from FIG. 1.
Figure 3:
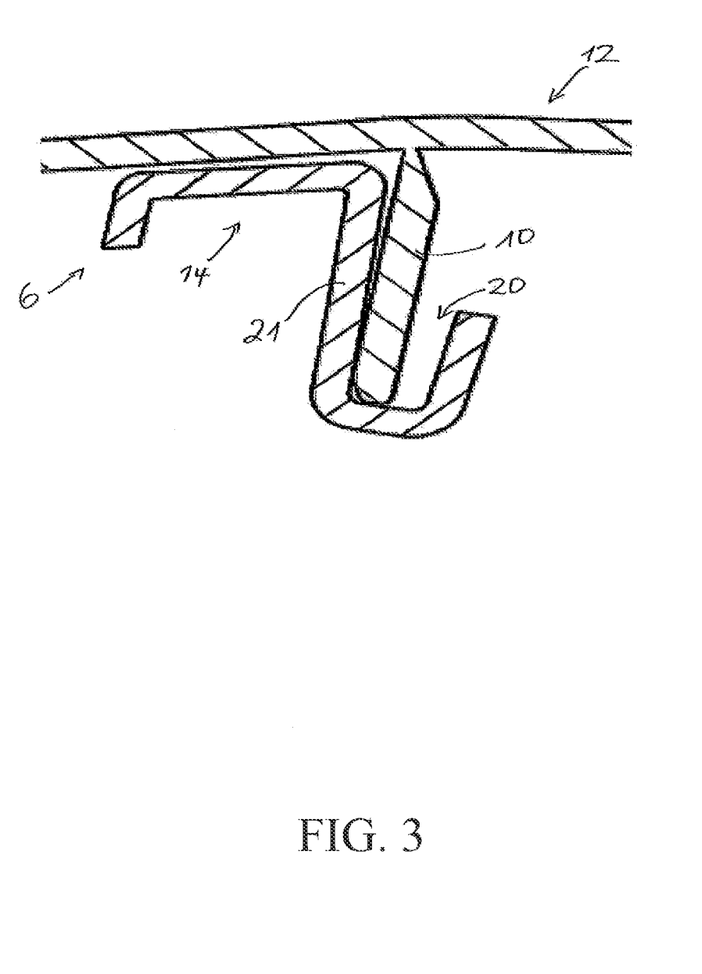
FIG. 3 illustrates a cross-section along the section line from FIG. 1.

As illustrated in particular by the diagrams in FIGS. 2 and 3, the fastening arm 6 has a first channel 14 and a second channel 20 having a C-shaped or U-shaped profile or cross-section.

Arranged on the fastening arm 6 along the section line II-II on a profiled element 21 is at least one latching hook 16 which is latched into an opening in the flange 10 of the bumper covering 12, the opening being designed as an aperture 18. The at least one latching hook 16 is arranged in a break in the second channel 20 having a C-shaped profile.

As illustrated in FIG. 3, the second channel 20 having a C-shaped profile is illustrated in cross-section along the section line Here, the second channel 20 is designed as a bracket module and engages around or encloses the flange 10 of the bumper covering at least partially.

The first channel 14 and the second channel 20 are open in opposite directions and are connected to one another via the common profiled element 21. Accordingly, the flange 10 of the bumper covering 12 is guided in the second channel 20 of the fastening arm 6 and is moreover secured against release by matching ribs of the second channel 20.

When implementing the first embodiment of the arrangement 2 in accordance with the invention, it is provided that the fastening rail 13 is preinstalled on a carcass/body of the vehicle. In the region of a wheel arch of the vehicle, the fastening rail 13 is extended in a downward direction by the connection module 4. A stiffening of the flange 10 of the bumper covering 12 relative to the fastening rail 13 takes place by way of the fastening arm 6 which has the first channel 14 and the second channel 20 having a C-shaped profile. The flange 10 of the bumper covering 12 can be adopted as a component of the bumper covering 12, and thus, retained.

A modification of the flange 10 of the bumper covering 12 can take place as a function of a given tool technology and a slider geometry.

During installation of the arrangement 2, the flange 10 of the bumper covering 12 is fed or pushed into the second C-shaped channel 20 of the fastening arm 6 of the connection module 4. In the process, the latching hooks 16 of the fastening arm 6 latch into the apertures 18 in the flange 10 of the bumper covering 12.

Figure 4:
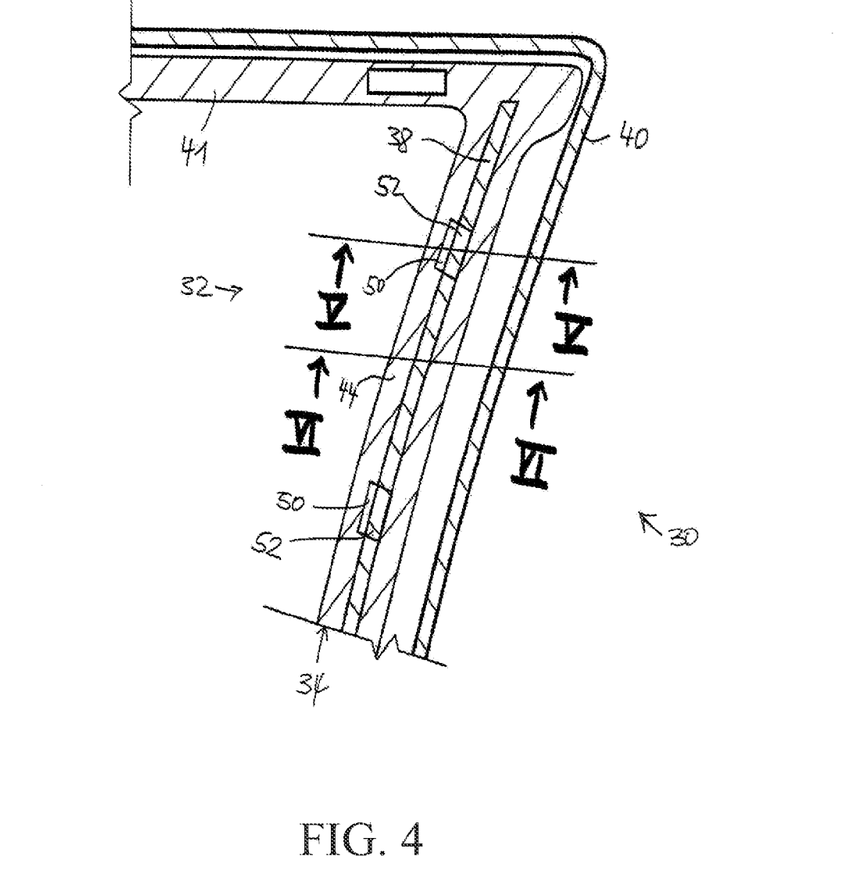
FIG. 4 illustrates a schematic view of a second embodiment of an arrangement in accordance with the invention.

FIG. 4 illustrates in a schematic view, a second embodiment of an arrangement 30 in accordance with the invention for a vehicle. Arrangement 30 includes a second embodiment of a connection module 32, having a fastening arm 34. The arrangement 30 further includes a second embodiment of a flange 38 of a bumper covering 40 and a second embodiment of a fastening rail 41.

Figure 5:
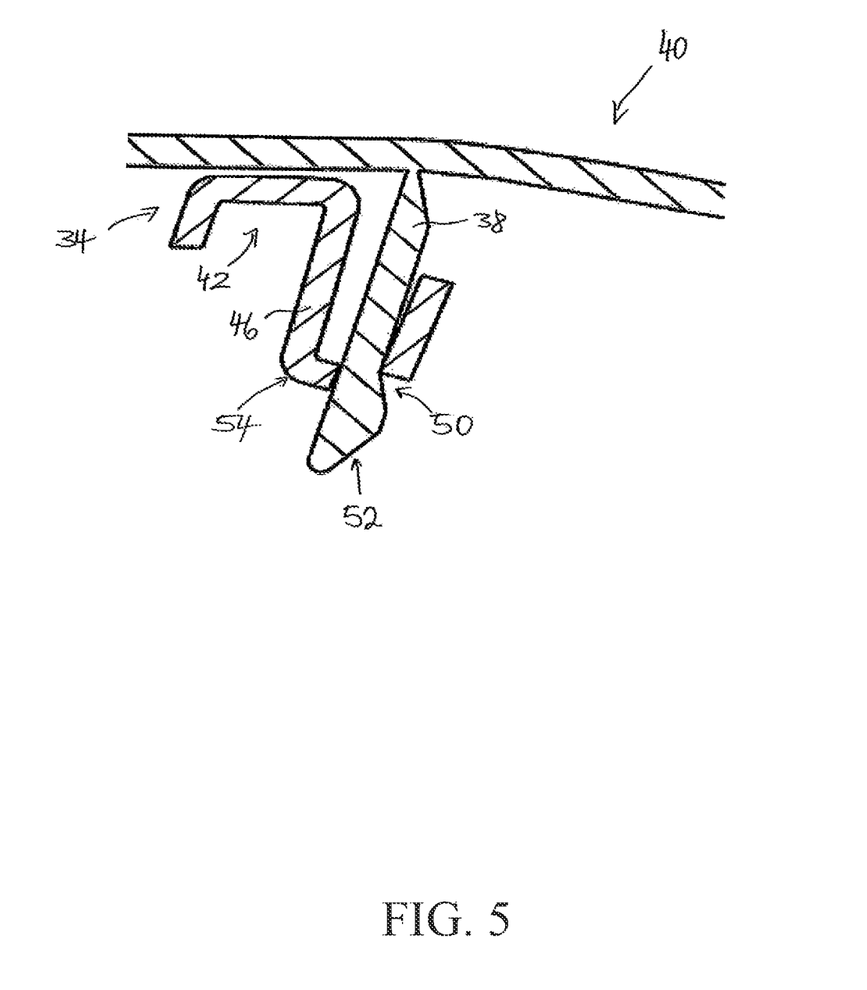
FIG. 5 illustrates a cross-section along the section line V-V from FIG. 4.
Figure 6:
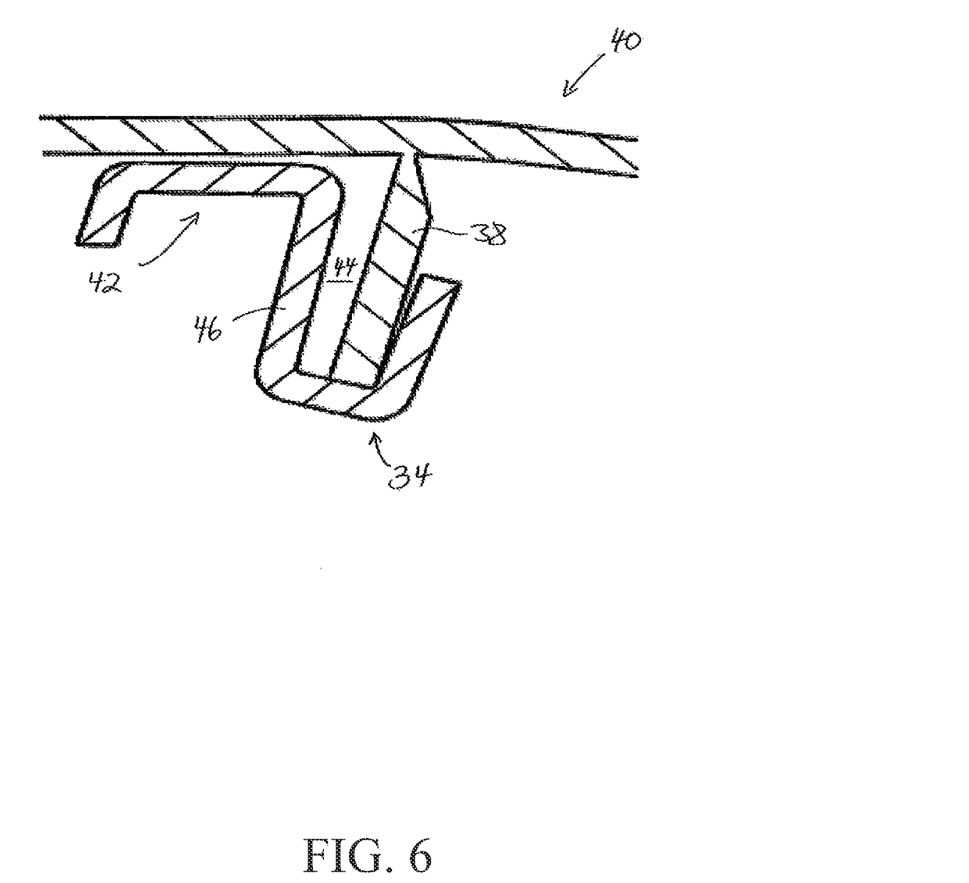
FIG. 6 illustrates a cross-section along the section line VI-VI from FIG. 4.

FIG. 5 illustrates a detail of the arrangement 30 along the section line V-V from FIG. 4. FIG. 6 illustrates a detail from FIG. 4 along the section line VI-VI.

It can be seen from FIGS. 5 and 6 that the fastening arm 34 has a profile with a first channel 42 with C-shape or U-shape and a second channel 44 with a C-shape or U-shape. Openings of the first channel 42 and the second channel 44 are oriented in opposite directions. The first channel 42 and the second channel 44 are connected to one another via a common profiled element 46.

As illustrated in FIGS. 5 and 6, the second channel 44 of the fastening arm 34 has an aperture 50 as an opening, into which a latching hook 52 of the flange 38 of the bumper covering 40 is latched. It is provided here that the latching hook 52 is integrated in the flange 38 of the bumper covering 40. The second channel 44 moreover has a spring tab 54, by way of which the latching hook 52 of the flange 38 of the bumper covering 40 is additionally secured against release.

As illustrated in FIG. 6, the second channel 44 of the fastening arm 34 is designed along its further course as a bracket module into which the flange 38 of the bumper covering 40 is fed. The flange 38 of the bumper covering 40 is moreover secured against release by way of matching ribs of the second channel 44.

When implementing the second embodiment of the arrangement 30 in accordance with the invention, the fastening rail 41 is preinstalled on a carcass of the vehicle. In the region of a wheel arch of the vehicle, the fastening rail 41 is extended in the downward direction by the connection module 32. A stiffening of the flange 38 of the bumper covering 40 relative to the fastening rail 41 takes place by way of the fastening arm 34 which has the first channel 42 and the second channel 44 having a C-shaped profile. The flange 38 can be adopted as a component of the bumper covering 40, and thus, retained. A modification of the flange 38 of the bumper covering 40 can take place as a function of a given tool technology and a slider geometry. During installation of the arrangement 30, the flange 38 of the bumper covering 40 is fed into the second channel 44 which is C-shaped of the fastening arm 34 of the connection module 32 of the fastening rail 41. In the process, the latching hooks 52 of the flange 38 of the bumper covering 40 latch into the apertures 52 in the second channel 44, and thus, in the fastening arm 34.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A connection module configured as an extension of a fastening rail and for connection to a bumper covering of a vehicle, the connection module comprising:
   a fastening arm configured for latching connection to the bumper covering, the fastening arm including a first channel and a second channel which are open in opposite directions and connected to each other via a profiled element,
   wherein a portion of the bumper covering is guided into the second channel and secured against release by ribs of the second channel.

2. The connection module of claim 1, wherein a flange of the bumper covering is receiving by the second channel.

3. The connection module of claim 2, wherein the second channel has an aperture configured to receive in latching engagement a latching hook of the flange of the bumper covering.

4. The connection module of claim 3, wherein the fastening arm has a spring tab provided in the second channel and configured to engage the latching hook to thereby prevent release of the latching hook from the aperture.

5. The connection module of claim 2, wherein at least one latch mechanism is provided on the profiled element and configured for receipt by an aperture in the flange of the bumper covering.

6. The connection module of claim 5, wherein in the at least one latch mechanism comprises a latching hook.

7. The connection module of claim 1, wherein:
   the first channel has one of a C-shaped and U-shaped cross-section; and
   the second channel has one of a C-shaped and U-shaped cross-section.

8. A vehicle arrangement comprising:
   a bumper covering;
   a connection module configured for connection to the bumper covering, the connection module including a fastening arm configured for latching connection to the bumper covering, the fastening arm including a first channel and a second channel which are open in opposite directions and connected to each other via a profiled element; and
   a fastening rail configured for connection to the body of the vehicle, wherein the fastening arm extends from the fastening rail.

9. The vehicle arrangement of claim 8, wherein the bumper covering includes a flange configured for receipt by the second channel.

10. The vehicle arrangement of claim 9, wherein:
    the flange includes a latching hook; and
    the second channel has an aperture configured to receive in latching engagement the latching hook.

11. The vehicle arrangement of claim 10, wherein the fastening arm has a spring tab provided in the second channel and configured to engage the latching hook to thereby prevent release of the latching hook from the aperture.

12. The vehicle arrangement of claim 9, wherein:
    at least one latch mechanism is provided on the profiled element; and
    the flange has at least one aperture configured to receive in latching engagement the at least one latch mechanism.

13. The vehicle arrangement of claim 12, wherein in the at least one latch mechanism comprises a latching hook.

14. The vehicle arrangement of claim 8, wherein:
    the second channel has ribs; and
    a portion of the bumper covering is guided into the second channel and secured against release by the ribs.

15. The vehicle arrangement of claim 8, wherein:
the first channel has one of a C-shaped and U-shaped cross-section; and
the second channel has one of a C-shaped and U-shaped cross-section.

16. The vehicle arrangement of claim 9, wherein the flange is configured for connection to a wheel arch cap of the vehicle.

17. A method of installing a vehicle arrangement, the method comprising:
providing a bumper covering having a flange, a connection module including a fastening arm having at least one channel and a fastening rail which is connected at one end to the fastening arm and another end to the vehicle body;
connecting the bumper covering to a wheel arch cap of the vehicle;
introducing the flange into the at least one channel and lockingly engaging the flange and the fastening arm.

* * * * *